United States Patent
Gac et al.

[19]

[11] Patent Number: 6,116,677
[45] Date of Patent: Sep. 12, 2000

[54] SEAT BACK CAB BACK TRIM PANEL FOR PICK-UP TRUCK APPLICATION WITH EXHAUSTER AND CHILD TETHER PROVISIONS

[75] Inventors: Gregory E. Gac, Troy; Dragi Jovan, Commerce; Jerry M. House, Madison Heights, all of Mich.

[73] Assignee: DaimlerChrysler Corporation, Auburn Hills, Mich.

[21] Appl. No.: 09/303,507

[22] Filed: Apr. 30, 1999

[51] Int. Cl.$^7$ ....................................................... B60N 2/02
[52] U.S. Cl. ................................... 296/65.16; 296/190.09
[58] Field of Search ................................ 296/39.1, 39.3, 296/65.16, 190.9, 208; 454/162, 164, 165

[56] References Cited

U.S. PATENT DOCUMENTS

| | | |
|---|---|---|
| 4,480,868 | 11/1984 | Koto . |
| 4,920,865 | 5/1990 | Pasquali et al. .......................... 98/2.18 |
| 4,971,380 | 11/1990 | Cote et al. . |
| 5,085,482 | 2/1992 | Moehlman et al. . |
| 5,094,318 | 3/1992 | Maeda et al. ....................... 296/39.3 X |
| 5,167,574 | 12/1992 | Ikeda et al. ............................... 454/164 |
| 5,503,178 | 4/1996 | Miskelley et al. ................... 454/165 X |
| 5,695,397 | 12/1997 | Frank et al. .............................. 454/164 |
| 5,921,619 | 7/1999 | Cederberg et al. ................. 296/190.09 |

*Primary Examiner*—D. Glenn Dayoan
*Assistant Examiner*—Jason Morrow
*Attorney, Agent, or Firm*—Roland A. Fuller, III

[57] ABSTRACT

A trim panel for mounting to a cabin wall of a vehicle, wherein the cabin wall includes an exhauster for relieving pressure within the cabin of the vehicle and a child-seat anchor for retaining a child seat. The trim panel includes a generally rigid support structure mounted to the cabin wall. The support structure includes an opening to enable the child-seat anchor to extend therethrough. The panel further includes a first bolster panel and a living hinge. The living hinge is integrally formed with the support structure and operates to pivotally interconnect the first bolster panel to the support structure. This arrangement enables the first bolster panel to conceal the child-seat anchor and support structure opening when the bolster panel is in a closed position. More preferably, the trim panel of the present invention includes a sound-insulating device for minimizing sound infiltration from the exhauster into the cabin.

20 Claims, 2 Drawing Sheets

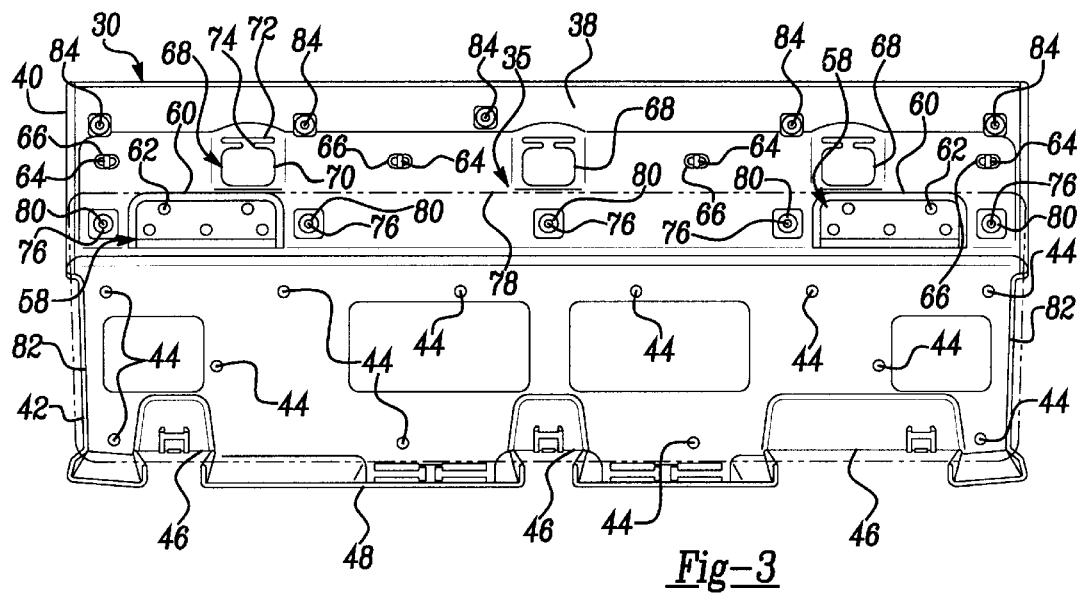
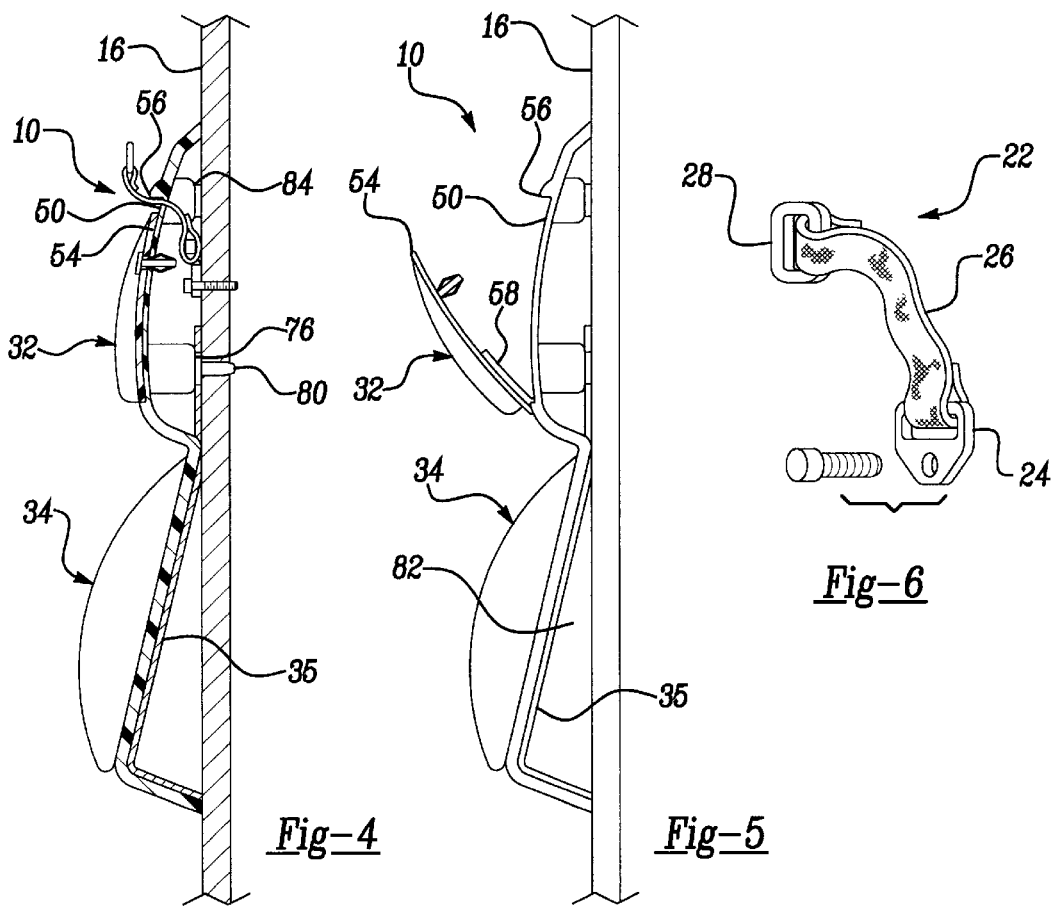

SEAT BACK CAB BACK TRIM PANEL FOR PICK-UP TRUCK APPLICATION WITH EXHAUSTER AND CHILD TETHER PROVISIONS

CROSS-REFERENCE TO RELATED APPLICATIONS

The present invention is related to the following co-pending U.S. patent application, which is incorporated herein by reference:

U.S. Ser. No. 09/302,723 for an invention entitled "CAB BACK TRIM PANEL FOR PICK-UP TRUCK APPLICATION WITH EXHAUSTER AND NVH IMPROVEMENTS."

FIELD OF THE INVENTION

The present invention relates to automotive trim panels and, more particularly, to a trim panel for a pick-up truck having a pivotable upper bolster for concealing a child seat anchor, an airflow duct for improving cabin ventilation, a sound insulating member for reducing NVH (noise, vibration, and harshness), and providing seat back support for rear club cab occupants.

BACKGROUND OF THE INVENTION

As is well known, many modern vehicles are designed and manufactured to produce a relatively airtight passenger cabin to minimize road noise. However, due to the efficient sealing of these cabins, passengers may experience a sudden pressure burst when a vehicle door is shut or the vehicle ventilation system is activated. Accordingly, vehicle manufactures have traditionally employed cabin exhausters to allow this pressure inside the cabin to be quickly exhausted outside the vehicle. These exhausters are commonly seen in vehicle door jams. However, it should be appreciated that the size of these exhausters is restricted due to the area available in these door jams locations.

Recently, there has been a trend in many vehicles, such as pick-up trucks, to position exhausters in the rear, sheet metal wall of the cabin, also known as the cab back. This location affords greater flexibility in exhauster design; namely, this location enables the size of the exhausters to be maximized to increase airflow. However, it should be appreciated to those skilled in the art that this mounting position in the cab back provides a direct path for noise infiltration into the passenger cabin. This direct noise path may also increase the level of vibration and harshness experienced in the passenger cabin. Furthermore, mounting of conventional trim panels against the cab back may limit the airflow from the cabin to the exhausters. Accordingly, it is desirable to provide sufficient air exchange between the passenger cabin and the exhausters. Additionally, it is desirable to minimize the noise, vibration, and harshness (NVH) from entering the passenger compartment from the exhausters.

Furthermore, recently-enacted motor vehicle regulations in Canada and the possibility of similar regulations being enacted in the United States has spurred development in child seat restraints. Generally, as of the 2000 model year, Canada requires that all passenger vehicles be equipped with an upper child-seat anchor for each seat other than the driver's. Therefore, in vehicles such as extended cab pick-ups, each auxiliary seat mounted behind the front seats must include a child-seat anchor. However, auxiliary rear seats are typically mounted on the plastic cab back trim panel, which may not afford adequate integrity during a collision. Therefore, in order to provide adequate integrity, these child-seat anchors should be mounted to the cab back sheet metal and extend through the trim panel. Consequently, it is also desirable to conceal these child-seat anchors when not in use to provide improve aesthetics. Accordingly, it is desirable to provide a concealing device that enables convenient access to mounting locations for aftermarket retrofitting of the child-seat anchors.

SUMMARY OF THE INVENTION

In accordance with the broad teachings of this invention, a trim panel for mounting to a cabin wall of a vehicle having an advantageous construction is provided. The cabin wall includes an exhauster for relieving pressure within the cabin of the vehicle and a child-seat anchor for retaining a child seat. The trim panel includes a generally rigid support structure mounted to the cabin wall. The support structure includes an opening to enable the child-seat anchor to extend therethrough. The panel further includes a first bolster panel and a living hinge. The living hinge is integrally formed with the support structure and operates to pivotally interconnect the first bolster panel to the support structure. This arrangement enables the first bolster panel to conceal the child-seat anchor and support structure opening when the bolster panel is in a closed position. More preferably, the trim panel of the present invention includes a sound-insulating device for minimizing sound infiltration from the exhauster into the cabin.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a rear view of the trim panel illustrating the living hinges pivotally mounted to the upper bolster panel and the sound-insulating material;

FIG. 4 is a cross-sectional view of the trim panel taken along line 4—4 of FIG. 2;

FIG. 5 is a partial cross-sectional view of the trim panel in an opened position; and FIG. 6 is a perspective view of a child-seat anchor and strap assembly.

DETAILED DESCRIPTION OF THE PREFERRED EMBODIMENTS

Figure 1:
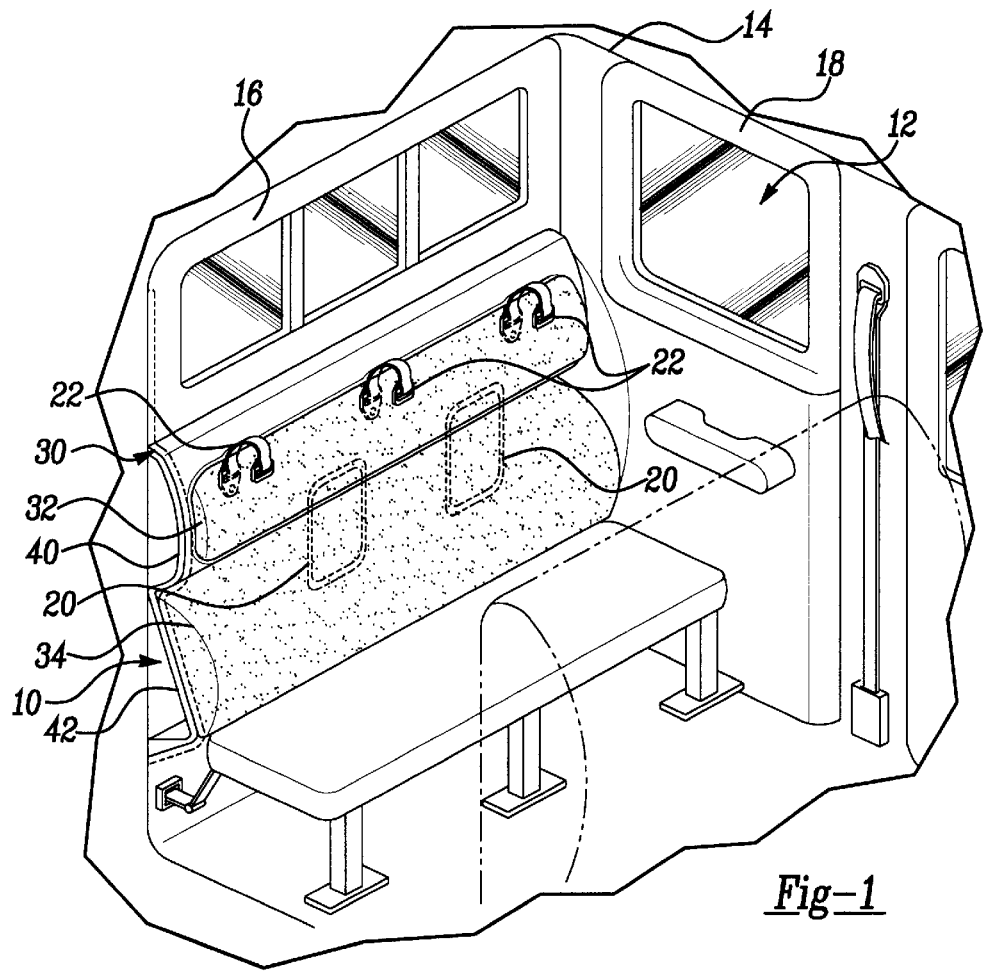
FIG. 1 is a perspective view of an extended cabin of a pick-up truck having the trim panel of the present invention.

The following description of the preferred embodiment is merely exemplary in nature and is in no way intended to limit the invention, its application, or uses. For example, the trim panel disclosed herein may have utility in a variety of vehicle applications.

Referring to the drawings, a trim panel assembly 10 is shown incorporated in an extended cabin 12 of a pick-up truck 14. Cabin 12 generally includes a rear wall 16, a pair of sidewall 18 (only one shown), and a front wall or windshield (not shown). Rear wall 16 is preferably made of sheet metal and includes a pair of exhausters 20 (shown hidden). Exhausters 20 are adapted for releasing cabin pressure upon detection of a pressure increase such as during closure of a vehicle door or activation of the vehicle ventilation system. Preferably, exhausters 20 are rubber flaps held closed by gravity that open when subjected to a predetermined pressure differential. It should be appreciated that the predetermined relief pressure and size of exhausters 20 are dependent upon the specific vehicle for which the exhausters are to be used.

A set of child-seat anchor assemblies 22 are mounted to rear wall 16 in a position generally dictated by motor vehicle regulations. As best seen in FIG. 6, each of the child-seat anchor assemblies 22 include a mounting bracket 24, strap 26, and D-ring 28. Mounting bracket 24 is mounted to rear wall 16 using a suitable fastener, such as a bolt. Strap 26 interconnects mounting bracket 24 and D-ring 28. Strap 26 is made of webbing approved for a specified load. D-ring 28 is adapted to cooperate with a mounting strap (not shown) included on a conventional child safety seat.

Figure 2:
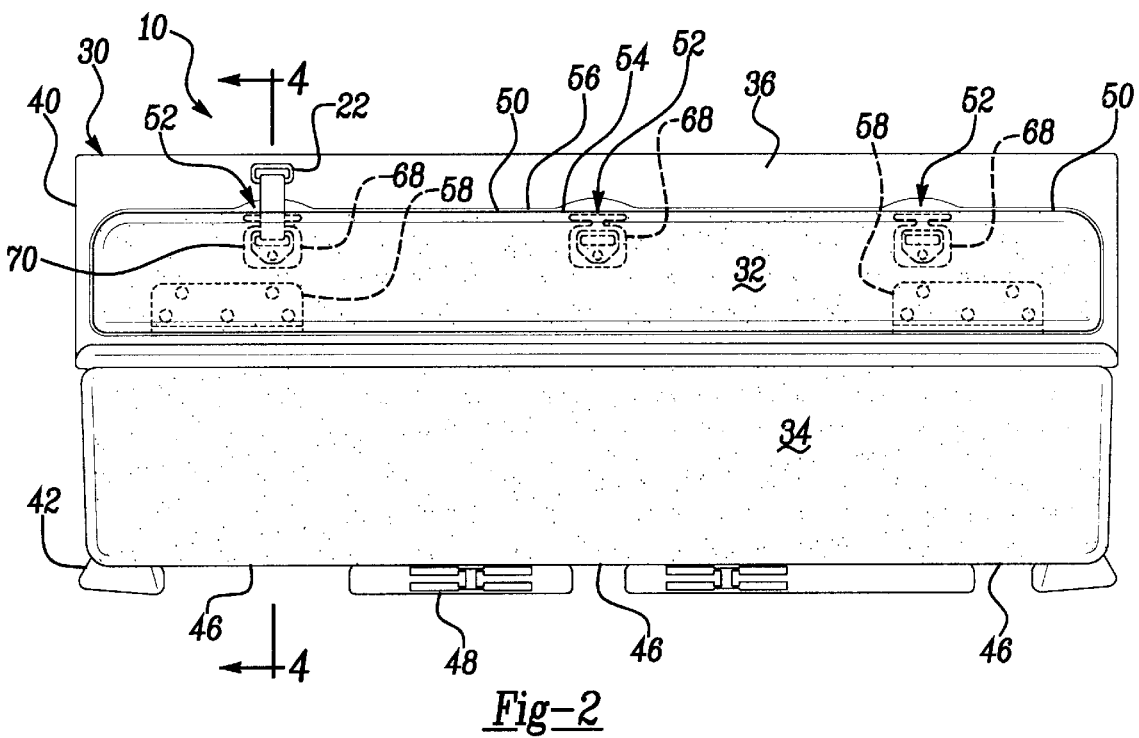
FIG. 2 is a front view of the trim panel illustrating the upper and lower bolster panels and a child-seat anchor strap extending between the upper bolster panel and the support structure.

Referring now to FIGS. 1–3, trim panel assembly 10 includes a support structure 30, an upper padded bolster panel 32, a lower padded bolster panel 34, and a sound-insulating member 35. Support structure 30 includes a front surface 36 and a rear surface 38. Front surface 36 is generally continuous having an upper convex portion 40 and a lower convex portion 42. Lower convex portion 42 is shaped to provide addition support to lower padded bolster panel 34 for improve occupant comfort. As best seen in FIG. 3, lower convex portion 42 includes a plurality of mounting holes 44 for receiving a plurality of suitable pins or fasteners (not shown) extending from lower padded bolster panel 34. Preferably, the pins extending from lower bolster panel 34 are heat staked to support structure 30 in a known manner.

Still referring to FIG. 3, lower convex portion 42 of support structure 30 further includes a plurality of horizontally spaced notches 46 disposed upon a lower edge 48 of lower convex portion 42. Each of the plurality of notches 46 is a predetermined size to receive an associated spring clip (not shown) for mounting trim panel assembly 10 to rear wall 16 of cabin 12. A thorough discussion of these spring clips may be found in U.S. Pat. No. 4,971,380 issued on Nov. 20, 1990 to Cote et al. and entitled "VEHICLE BACKREST ATTACHING ARRANGEMENT," which is commonly owned by the assignee of the present application. This patent is hereby incorporated by reference.

Referring now to FIGS. 2 and 4, upper convex portion 40 of support structure 30 includes a depression 50 for receiving a portion of upper bolster panel 32. Depression 50 includes a set of slots 52 defined by an upper edge 54 of upper bolster panel 32 and an upper depression edge 56 of depression 50. Each of the slots 52 is adapted to receive strap 26 of child-seat anchor assembly 22 therethrough when upper bolster panel 32 is in a closed position.

Referring to FIGS. 2, 3, and 5, upper bolster panel 32 is pivotally coupled to support structure 30 using a pair of living hinges 58. Living hinges 58 are integrally formed with support structure 30 to enable pivotal movement relative to support structure 30. Although living hinges 58 are shown to enable upper bolster panel 32 to pivot downward, it is anticipated that living hinges 58 may be oriented to enable upper bolster panel 32 to pivot upward. Living hinges 58 are disposed in openings 60 of support structure 30 to facilitate molding of hinges 58. Living hinges 58 each includes a plurality of mounting holes 62 for receiving a plurality of suitable pins or fasteners (not shown) extending from upper bolster panel 32. Preferably, the pins extending from upper bolster panel 32 are heat staked to respective living hinges 58 in a known manner.

As best seen in FIG. 3, upper bolster panel 32 further includes a plurality of retaining devices 64 extending from a rear surface of upper bolster panel 32. Retaining devices 64 cooperate with a plurality of apertures 66 formed in upper convex portion 40 of support structure 30 to retain upper bolster panel in a closed position (see FIGS. 1 and 2). Preferably, retaining devices 64 are generally triangularly shaped spring clips. However, it should be appreciated that any retaining device capable of selectively releasing upper bolster panel 32 for pivotal movement may be used.

As best seen in FIGS. 2 and 3, upper convex portion 40 of support structure 30 further includes a plurality of openings 68 adapted to enable child-seat anchor assembly 22 to extend through support structure 30. Specifically, each of the plurality of openings 68 includes a main opening 70 and a secondary opening 72. Main opening 70 is shaped to accommodate mounting bracket 24 of child-seat anchor assembly 22. It should be appreciated that main opening 70 may be shaped so as to closely conform to the shape of mounting bracket 24 for improve aesthetic quality. Secondary opening is shaped to accommodate strap 26 of child-seat anchor assembly 22 (FIG. 2). Main opening 70 and secondary opening 72 are interconnected by a channel 74. Channel 74 simply enables strap 26 of child-seat anchor assembly 22 to be more easily routed from main opening 70 to secondary opening 72 during installation. Channel 74 is preferably narrower than strap 26 to insure strap 26 is retained in secondary opening 72 after installation.

Referring to FIGS. 3 and 4, sound-insulating member 35 is shown in phantom attached to support structure 30. Preferably, sound-insulating member 35 is made of cotton shoddy and ethyl vinyl acetate (EVA). Specifically, the EVA is ½ pounds per cubic foot and the cotton shoddy is 65 grams per cubic foot dry weight. The EVA and cotton shoddy are layered so as to define a flexible sheet of material, thereby defining sound-insulating member 35. Sound-insulating member 35 includes a plurality of mounting holes 76 extending along an upper edge 78. The plurality of mounting holes 76 of sound-insulating member 35 is adapted to be mounted on a plurality of corresponding suitable fasteners 80 extending from support structure 30. The plurality of fasteners 80 is preferably push-type plastic fasteners, also generally known as "christmas tree fasteners." Sound-insulating member 35 is positioned on rear surface 38 such that when trim panel assembly 10 is installed on rear wall 16 of cabin 12, sound-insulating member 35 is adjacent exhausters 20. This arrangement enables sound-insulating member 35 to absorb and insulate sound enter in through exhausters 20, thereby minimizing the introduction of sound into the passenger cabin 12. Preferably, sound-insulating member 35 extends along the entire length of support structure 30 to facilitate air exchange with exhausters 20. However, sound-insulating member 35 may be of any length that generally provides sufficient sound-insulating qualities.

As best seen in FIG. 5, air exchange between cabin 12 and exhausters 20 is further facilitated by a pair of duct openings 82 disposed on opposing ends of lower convex portion 42 of support structure 30. According to the present embodiment, the pair of duct openings 82 are each generally triangular shaped and define an area of approximately 8 square inches. It should be appreciated that sound-insulating member 35 and rear wall 16 of cabin 12 cooperate to define an unobstructed air passage between the pair of duct openings 82 and exhausters 20.

During installation, sound-insulating member 35 is temporarily attached to the plurality of fasteners 80 extending through support structure 30. Child-seat anchor assemblies 22 may be attached to rear wall 16 of cabin 12 prior to installation of trim panel assembly 10 by an assembly line worker or may be attached subsequent to installation of trim panel assembly 10 by a dealership mechanic. Trim panel assembly is then positioned adjacent rear wall 16 such that the plurality of fasteners 80 is received within a plurality of corresponding holes (not shown) formed in rear wall 16, thereby securely retaining sound-insulating member 35 between support structure 30 and rear wall 16 adjacent exhausters 20. Support structure 30 is further provided with addition suitable fasteners 84, such as "christmas tree fasteners." Fasteners 84, like fasteners 80, are received with a plurality of corresponding holes (not shown) formed in rear wall 16 for securely retaining trim panel assembly 10 to rear wall 16 of cabin 12.

During operation, upper bolster panel 32 may simply and conveniently be opened to reveal child-seat anchor assemblies 22. Upper bolster panel 32 is opened by grasping upper edge 54 of upper bolster panel 32 and pulling until retaining devices 64 release. Upper bolster panel 32 will then pivot about living hinges 58 to expose openings 68. It should be appreciated that this process may be employed for mounting child-seat anchor assemblies 22 after production of vehicle 14.

D-ring 28 may then be positioned such that D-ring 28 and strap 26 extend from slots 52. Upper bolster panel 32 is then closed until retaining devices 64 engage, thereby enabling a child-seat to be attached thereto. It should be noted that slots 52 are positioned generally near the mounted end of strap 26. This arrangement ensures that if strap 26 is put in tension during a collision, such tension will not force upper bolster panel 32 to open.

When child-seat anchor assemblies 22 are not in use, D-ring 28 and strap 26 may be stored behind upper bolster panel 32 by simply opening upper bolster panel 32 and tucking D-ring 28 and strap 26 behind panel 32, thereby improving the aesthetic quality of the auxiliary seat.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A trim panel for mounting to a cabin wall in a motor vehicle, said cabin wall having an exhauster for relieving pressure within the cabin of said vehicle, said cabin wall further having a child-seat anchor for retaining a child seat, said panel comprising:
    a generally rigid support structure adapted to be mounted to the cabin wall, said support structure having an opening adapted to enable the child-seat anchor to extend therethrough;
    a first bolster panel; and
    a living hinge being integrally formed with said support structure, said living hinge pivotally interconnecting said first bolster panel to said support structure such that said first bolster panel conceals said opening when said first bolster panel is in a closed position.

2. The trim panel according to claim 1, further comprising:
    a sound-insulating member mounted between said support structure and the cabin wall for minimizing sound infiltration from the exhauster into the cabin.

3. The trim panel according to claim 2 wherein said sound-insulating member is formed from a composite material.

4. The trim panel according to claim 3 wherein said composite material is comprised of an ethyl vinyl acetate layer fixed to a cotton shoddy layer.

5. The trim panel according to claim 1, further comprising:
    a duct disposed in said support structure for providing airflow through the exhauster.

6. The trim panel according to claim 1 wherein said first bolster panel and said support structure cooperate to define a slot between said first bolster panel and said support structure, said slot adapted for accommodating a strap from the child-seat anchor extending therethrough when said first bolster panel is in said closed position.

7. The trim panel according to claim 1, further comprising:
    a retaining device selectively interconnecting said first bolster panel and said support structure for retaining said first bolster panel in said closed position.

8. The trim panel according to claim 1 wherein said first bolster panel is generally padded.

9. The trim panel according to claim 1, further comprising:
    a second bolster panel being mounted to said support structure, said second bolster panel cooperating with said first bolster panel to provide a generally continuous surface.

10. A trim panel for mounting to a cabin wall in a motor vehicle, said cabin wall having an exhauster for relieving pressure within the cabin of said vehicle and a child-seat anchor for retaining a child seat, said panel comprising:
    a generally rigid support structure adapted to be mounted to the cabin wall, said support structure having an opening adapted to enable the child-seat anchor to extend therethrough;
    a first bolster panel;
    a living hinge being integrally formed with said support structure, said living hinge pivotally interconnecting said first bolster panel to said support structure such that said first bolster panel conceals said opening when said first bolster panel is in a closed position; and
    a sound-insulating member mounted between said support structure and the cabin wall for minimizing sound infiltration from the exhauster into the cabin.

11. The trim panel according to claim 10 wherein said sound-insulating member is formed from a composite material.

12. The trim panel according to claim 11 wherein said composite material is comprised of an ethyl vinyl acetate layer fixed to a cotton shoddy layer.

13. The trim panel according to claim 10, further comprising:
    a duct disposed in said support structure for providing airflow through the exhauster.

14. The trim panel according to claim 10 wherein said first bolster panel and said support structure cooperate to define a slot between said first bolster panel and said support structure, said slot adapted for accommodating a strap from the child-seat anchor extending therethrough when said first bolster panel is in said closed position.

15. The trim panel according to claim 10, further comprising:

a retaining device selectively interconnecting said first bolster panel and said support structure for retaining said first bolster panel in said closed position.

16. The trim panel according to claim 10 wherein said first bolster panel is generally padded.

17. A trim panel for mounting to a cabin wall in a motor vehicle, said cabin wall having an exhauster for relieving pressure within the cabin of said vehicle and a child-seat anchor for retaining a child seat, said panel comprising:

a generally rigid support structure adapted to be mounted to the cabin wall, said support structure having an opening adapted to enable the child-seat anchor to extend therethrough;

a first padded bolster panel;

a living hinge being integrally formed with said support structure, said living hinge pivotally interconnecting said first bolster panel to said support structure such that said first bolster panel conceals said opening when said first bolster panel is in a closed position;

a second padded bolster panel being mounted to said support structure, said second bolster panel cooperating with said first bolster panel to provide a generally continuous padded surface; and a sound-insulating member mounted between said support structure and the cabin wall for minimizing sound infiltration from the exhauster into the cabin.

18. The trim panel according to claim 17 wherein said sound-insulating member is formed from a composite material.

19. The trim panel according to claim 18 wherein said composite material is comprised of an ethyl vinyl acetate layer fixed to a cotton shoddy layer.

20. The trim panel according to claim 17, further comprising:

a retaining device selectively interconnecting said first bolster panel and said support structure for retaining said first bolster panel in said closed position.

* * * * *